United States Patent

[11] 3,589,849

[72] Inventors Edward L. Sturm;
William H. Horton, both of Rochester, N.Y.
[21] Appl. No. 850,009
[22] Filed Aug. 14, 1969
[45] Patented June 29, 1971
[73] Assignee Eastman Kodak Company
Rochester, N.Y.

[54] DAMPENING CONTROL DEVICE FOR PERCUSSIVE PHOTOFLASH FIRING MECHANISM
10 Claims, 5 Drawing Figs.
[52] U.S. Cl. .................................................. 431/93, 95/11.5
[51] Int. Cl. .................................................. F21k 5/02, G03b 15/04
[50] Field of Search ......................................... 431/93, 98

[56] References Cited
UNITED STATES PATENTS
| | | | |
|---|---|---|---|
| 1,063,778 | 6/1913 | Courson | 431/98 X |
| 3,454,755 | 7/1969 | Wick | 240/1.3 |
| 3,511,586 | 5/1970 | Kopelman | 431/93 |

Primary Examiner—Edward J. Michael
Attorneys—Robert W. Hampton and J. Addison Mathews ABSTRACT: A firing mechanism for use with percussively ignitable flashlamps in a multilamp unit. The mechanism includes a camming device for temporarily withdrawing a mechanical actuating member from the unit in response to rotation of the unit, and is provided with dampening means for preventing accidental firing of the flashlamps upon reentry of the actuating member into the unit. The actuating member is movable into the unit to sequentially sense the condition of and to fire successive flashlamps in the unit, and the camming device and dampening means include camming surfaces on a unit-receiving socket both to cam the member out of the unit and to permit stepwise return of the member into the unit.

PATENTED JUN29 1971

EDWARD L. STURM
WILLIAM H. HORTON
INVENTORS

BY J. Adding Matthews
Robert W Hampton

ATTORNEYS

EDWARD L. STURM
WILLIAM H. HORTON
INVENTORS

BY J. Addisyn Mathews
Robert W Hampton
ATTORNEYS

DAMPENING CONTROL DEVICE FOR PERCUSSIVE PHOTOFLASH FIRING MECHANISM

BACKGROUND OF THE INVENTION

The present invention relates to photographic cameras, or attachments, having mechanisms for mechanically sensing the condition of and/or firing percussively ignitable flashlamps in multilamp units or flashcubes. More particularly, the invention relates to such mechanisms useable with percussive flashlamps having preenergized strikers, and to control or dampening means for moving a sensing and/or firing member into engagement with the striker without firing the flashlamp.

It is well known in the photographic art to provide cameras with electrical means for firing camera-mounted flashlamps, and for sensing the operative or inoperative condition of such flashlamps.

More recently, and in order to obviate the necessity of an electrical source and circuit in photoflash apparatus, percussively ignitable flashlamps have been developed. Corresponding in some respects to cameras using electrically fireable flashlamps, cameras adapted to receive the percussively ignitable flashlamps have been provided with mechanical means for firing the lamp and for sensing the operative or inoperative condition of the lamp. Such mechanical mechanisms are disclosed, for example, in commonly assigned, copending U.S. Pat. applications Ser. No. 766,751, entitled Percussion-Ignitable Flash Unit Having Contact-Actuatable, Pre-Energized Strikers And Photographic Apparatus Using Such Units, filed on Oct. 11, 1968 in the name of Poweska al., and Ser. No. 767,145, entitled Control And Signal Mechanism For Use With Percussion-Ignitable Photoflashlamps, filed on Oct. 14, 1968 in the name of E. L. Sturm. In the Poweska et al. application, a camera-actuating member, held in an energized position displaced from the flashlamp, is released upon shutter actuation and rapidly moves into engagement with a preenergized flashlamp striker to dislodge the striker and fire the flashlamp. In the Sturm application, depression of a camera body release or shutter actuating mechanism moves a sensing and actuating probe into engagement with the preenergized striker in the flashlamp first to sense the operative or inoperative condition of the flashlamp and then to dislodge the striker and fire the flashlamp.

Still more recently, it has been found particularly advantageous, in sensing and/or firing preenergized flashlamps, to move the sensing and/or actuating member into contact with the lamp striker as soon as the lamp is positioned at the forwardly facing or firing position. Mechanisms for accomplishing this result, and certain of the particular advantages thereof, are disclosed in commonly assigned and concurrently filed U.S. Pat. applications Ser. No. 850,701, entitled Flash Firing And Sensing Mechanism For Camera Or Attachment Adapted To Use Percussively Fireable Flashlamps, filed on Aug. 14, 1969, in the names of W. H. Horton and C. Michatek; and Ser. No. 850,125, entitled Firing Mechanism For Percussively Ignitable Flashlamps, filed on Aug. 14, 1969, in the name of E. L. Sturm. Briefly, these latter mechanisms permit sensing of the flashlamp's operative or inoperative condition as soon as and for the entire period of time the flashlamp is in the forwardly facing position. Thus, the camera operator easily can detect such lamp condition when he picks up the camera and without having to risk an accidental exposure by partially depressing the camera body release or shutter-actuating means.

Previously known flashlamp sensing and firing mechanisms generally have been satisfactory for their intended purposes. However, under certain operating conditions, it is possible in mechanisms of the latter referred to type (disclosed in the above-mentioned Horton et al. and Sturm applications) to accidentally fire a flashlamp upon rotation thereof to the firing position. Moreover, this problem has been particularly difficult to solve because it results at least in part from the previously mentioned and important advantage in contacting or sensing the lamp striker as soon as the lamp reaches the forwardly facing position.

Referring more specifically and by way of example to these latter mechanisms, a sensing and actuating member is released upon the positioning of a flashcube on the camera, and moves upwardly through an opening in the cube base into sensing or nonreleasing engagement with a striker wire lodged in a preenergized condition. Thereafter the actuating member can be impacted or struck to dislodge the striker wire and fire the cube. When the cube is indexed or rotated, camming means, including a part of the cube itself or of the cube receiving socket, temporarily withdraw the sensing and actuating member from the cube until the next successive flashlamp is in the forwardly facing position. Then the sensing and actuating member is permitted to return to its raised position in sensing or nonreleasing contact with the striker wire, and, under ordinary operating conditions, it will not effect firing of the flashlamp until the member again is impacted. However, under certain conditions, for example, when the cube is rapidly or continuously indexed, it has been found that the velocity with which the actuating member returns to its striker-contacting position will be sufficient to dislodge the striker and accidentally fire the lamp.

SUMMARY OF THE INVENTION

It is, therefore, an object of the present invention to overcome the above-noted problems encountered with previously known mechanisms, and to provide an improved sensing and/or actuating mechanism which is simple but reliable in operation, and which particularly is adapted for use with multilamp units supporting a plurality of flashlamps having preenergized strikers.

It is further an object of the present invention to provide a control or dampening device for a sensing and/or actuating mechanism, wherein the mechanism is of the general type that moves a sensing and/or actuating member into nonreleasing engagement with a preenergized lamp striker at some distinct time prior to firing the flashlamp.

A still further object of the present invention is to provide a mechanism of the above-mentioned type, that includes control surfaces associated with a rotatable or indexable multilamp socket and a control follower cooperative with such control surfaces to control movement of the sensing and/or actuating arm in response to rotation or indexing of the socket.

In accordance with a preferred embodiment of the invention, a camera or attachment is provided with a control or dampening device for a mechanical flashlamp sensing and/or firing mechanism. The device is particularly adopted for use with cameras of a type for use with percussively ignitable flashlamp devices having a preenergized percussive strikers and received in a multilamp unit or flashcube detachably positionable in a socket on the camera. The mechanism preferably includes a sensing and/or actuating member that automatically moves into the unit in response to positioning of the unit in the socket, thereby to engage and/or sense the operative or inoperative condition of a flashlamp at the firing locus, and without depending for this part of its operation on actuation of other camera mechanisms such as the body release or shutter-actuating member. To permit indexing of the flash devices, or rotation of the multilamp unit, the socket is rotatable or indexable and is provided with associated control or camming surfaces engageable with or coupled to the sensing and actuating member to temporarily withdraw the member from the multilamp unit, and then to permit reentry of the member into the unit, in response to rotation or indexing of the socket. Accidental firing of the flashlamp upon such rotation is prevented by a control or dampening means which effects, for example, a multistep return of the member into engagement with the wire. dr

DESCRIPTION OF THE PREFERRED EMBODIMENT

Figure 1:
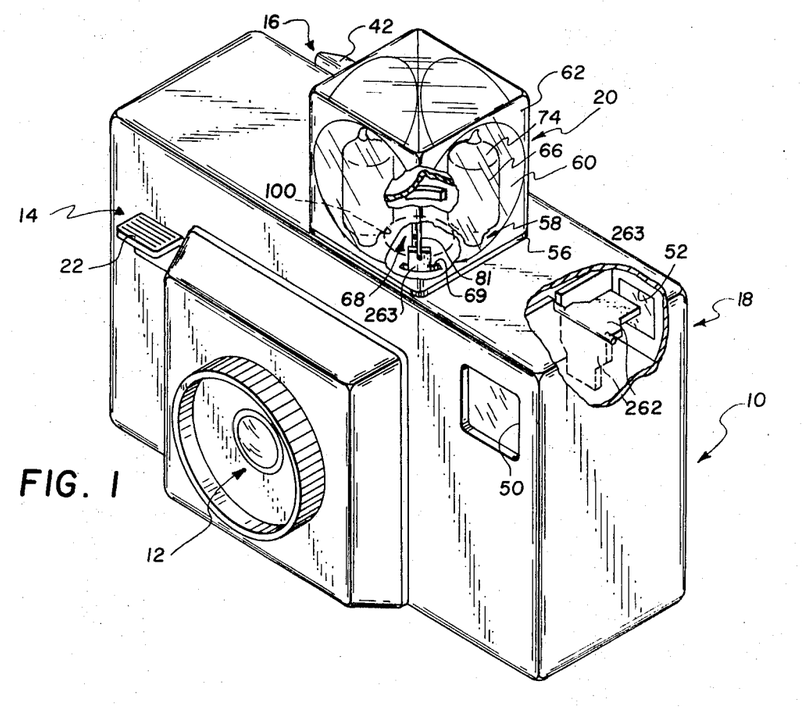
FIG. 1 is a perspective view of a multilamp flash unit or flashcube on a camera incorporating the present invention and illustrates a camera sensing or actuating member in engagement with a preenergized striker wire in the flash unit and a warning flag positionable by the sensing and actuating member.

Referring now to the drawings and particularly to FIG. 1, a camera for incorporating a preferred embodiment of the invention is illustrated comprising a camera casing 10 supporting an objective 12, a body release or depression member 14 for effecting operation of shutter 15 (FIG. 4), a film-winding member 16, and a viewfinder 18. A percussively ignitable flashcube 20 is removably or detachably received on the camera, for firing in synchronism with operation of the shutter 15.

GENERAL CAMERA FEATURES

The various camera mechanisms are more clearly disclosed in aforementioned concurrently filed U.S. Pat. application Ser. No. 850,125, (Sturm). Briefly, however, the preferred body release or depression member 14 comprises a depression or manually engageable surface 22, accessible from outside the camera casing 10, and a body portion 23 (FIG. 4) within the camera interior for latching or maintaining an impacting member such as a shutter driver in a first latched and cocked or energized position. The body release or depression member is movable by the manually engageable surface to effect release of the impacting member or shutter driver in the usual manner to actuate the camera shutter and various other camera mechanisms as will be described more fully hereinafter.

Figure 4:
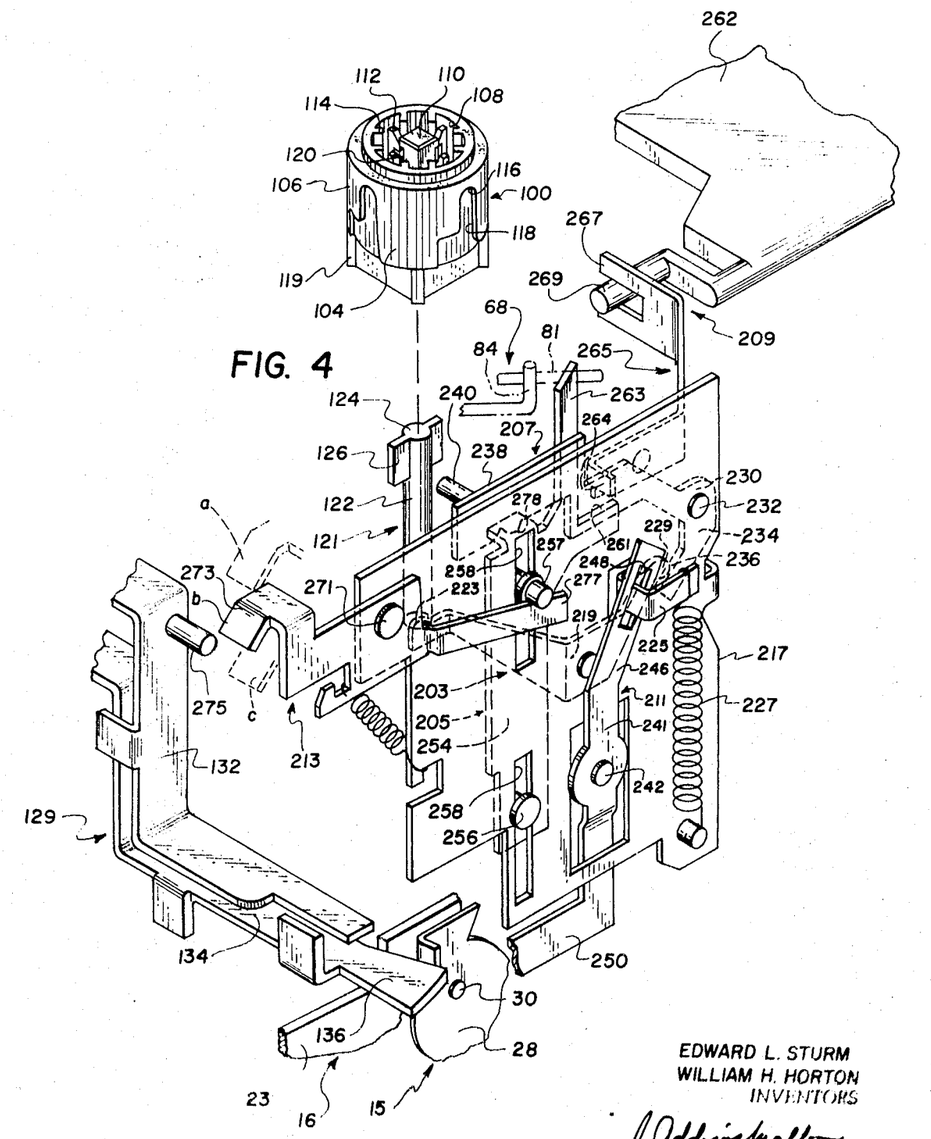
FIG. 4 is a perspective and schematic view of a sensing and actuating mechanism for sensing the condition of and percussively firing a flashcube of the type illustrated in FIGS. 2 and 3, and further depicting the cube socket and associated mechanism for withdrawing the sensing and actuating mechanism from the cube upon socket indexing.

The shutter 15 is illustrated in FIG. 4 as a single-blade impact type, having an aperture covering member, such as blade 28, pivotally mounted in the camera or casing at 30. The shutter is normally maintained in a closed position against a stop by a hairpin spring or other energy storing means, and is adapted to be engaged or struck by the impacting member or shutter driver upon release thereof, to effect opening of the shutter and uncovering of the exposure aperture for the proper exposure period and in the usual manner.

Winding mechanism 16 is more clearly illustrated in concurrently filed Sturm U.S. Pat. application Ser. No. 850,125 entitled Mechanism For Firing Percussively Ignitable Flashlamps. As disclosed in said application, the mechanism includes a handle and actuating member 42, (FIG. 1) accessible from the camera exterior and rotatable or oscillatable to advance film through the camera and to index or set various camera operating mechanisms such as the multilamp flash unit and the impacting member or shutter driver.

Viewfinder 18 is of a usual type, well known to those skilled in the art, and comprises a front window or focusing means 50, a back or viewing window 52, and sufficient space therebetween for receiving a signal means such as a translucent warning flag to be described more fully hereinafter.

THE MULTILAMP FLASH UNIT

Figures 2, 3:
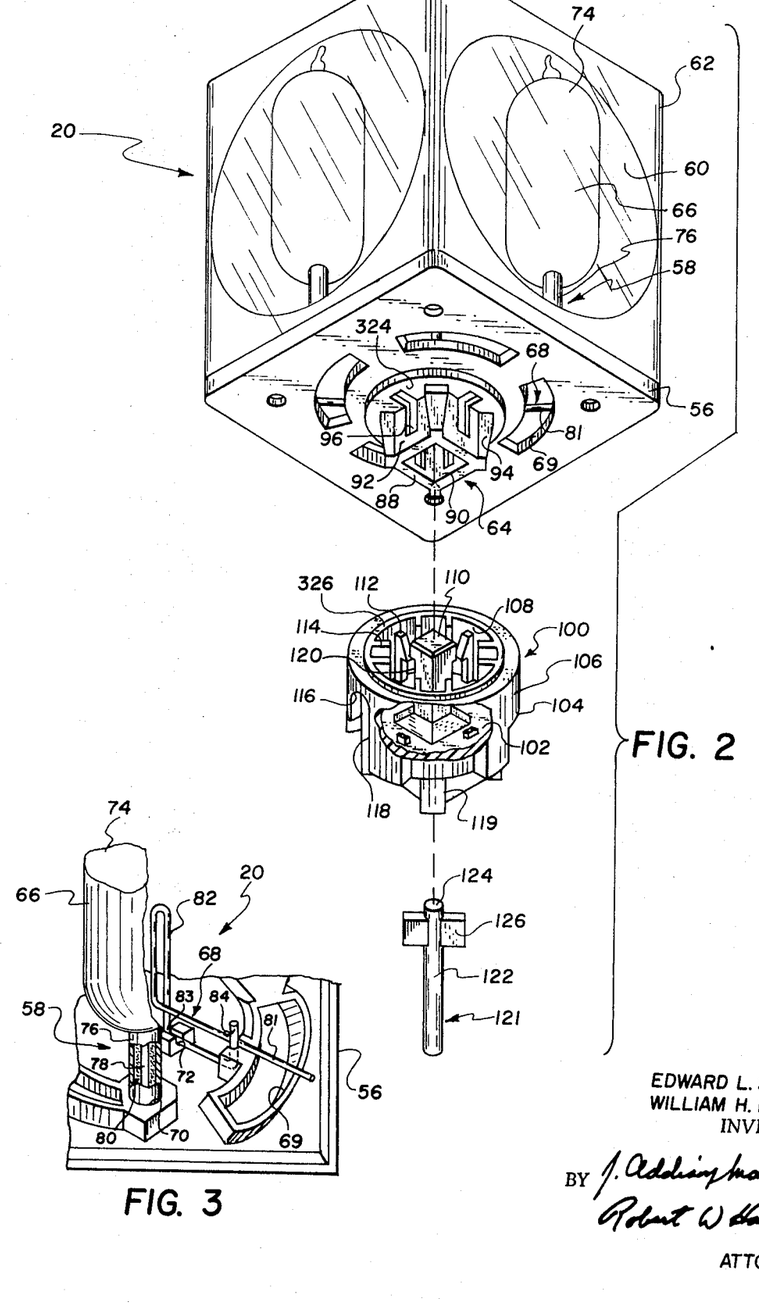
FIG. 2 is an exploded view of a percussively ignitable flashcube adapted to be received on the camera of FIG. 1, and of a socket construction for removably or detachably receiving such flashcube on the camera.
FIG. 3 is a partial perspective view of the flashcube of FIG. 2 with parts broken away to illustrate the interior of the cube including a flashlamp having a percussion sensitive tube or anvil and a preenergized striker wire for percussively striking the tube or anvil.

Referring now to FIGS. 2 and 3, and more particularly to the details of a multilamp flash unit or flashcube for supporting a plurality of preenergized flashlamp devices, the illustrated cube comprising a base 56 for supporting a plurality of percussively ignitable flash devices 58, reflecting means such as polished metal foil formed into concaved discs 60, a cover member of transparent material 62, and a support or indexing means such as post 64. Each flash device includes a flashlamp 66 and a pretensioned or preenergized striker 68 lodged over means in the cube base defining openings or slots 69 passing entirely through the base and into which a camera sensing or actuating member can be moved upwardly into contact with the striker wire to dislodge the same and fire the flashlamp. On one side of the base normally referred to as the upper face thereof, means are provided for securely supporting each of the flashlamps 66 and striker wires 68. As illustrated most clearly in FIG. 3, these means comprise a circular opening defining a bore 70, for receiving a portion of the flashlamp, and slots 72, for receiving a knee portion of the striker wire. The upper face of base 56 also may be provided with a stop member for maintaining the striker wire 68 in its tensioned condition. However, in the embodiment illustrated, the function of this stop member is provided by a bent portion of the striker wire itself, as will be described more fully hereinafter.

Each of the four flashlamps 66 comprises a hermetically sealed envelope 74 containing combustible material such as a zerconium foil in a combustion supporting atmosphere such as oxygen. The base or lower portion of envelope 74 is formed and sealed around an impact-sensitive means such as an elongate soft or bendable tube 76 having a circular cross section and containing in spaced relation therein an anvil 78. In order to initiate combustion of the combustible material in envelope 74, a percussively ignitable material 80 is placed on anvil 78 or in the space between tube 76 and the anvil. Thus, tube 73 is adapted to be rapidly struck or impacted and deformed by striker wire 58 to fire the percussive material within the tube. Upon such firing the heat energy generated by ignition of the percussively ignitable material 80 conflagrates and is directed upwardly through the tube and into the envelope 74 to initiate combustion of the zerconium foil and thereby to fire the flashlamp. The lower or end portion of tube 76 further is shaped to cooperate with the circular hole or bore 70 defined in base 56 to securely support the flashlamp on the base.

The striker wire 68 is shown most clearly in FIG. 3 and comprises an elongated or striking leg 81 an upwardly bent central portion 82, adapted to be torsionally bent to energize the striking leg, a knee 83 for engaging the cube base to locate the striking wire on the base, and a second elongated leg including a bent end portion defining a stop 84 for maintaining the striking leg in the tensioned position. The elongated striking leg 81 is lodged and maintained by stop 84 over opening 69 in the base and is adapted to be engaged by the camera sensing or actuating member as previously mentioned to first sense the condition or position of the striker wire and thereafter to rapidly push or dislodge the striking leg upwardly over its respective stop 84 to release the striker and effect firing of the flashlamp.

The support of indexing means 64 is located on the other or lower face of base 56 from the flash devices and may be separately attached or integrally molded thereto. In the illustrated embodiment, the support or indexing means 64 includes a channel member 88 defining a square interior opening 90 and a substantially square external surface 92. At each of the four corners of the external surface, locating means 94 are provided comprising a rib having a tapered lowered portion and a substantially square upper portion. As will be described more fully hereinafter in connection with the camera socket, the ribs are first guided into the socket by the tapered portions until they are fully seated therein and then are held or maintained securely in their proper position relative to the socket by the upper square portions. Also provided on the outer surfaces of channel member 88, and between the ribs 94, are recessed or slot portions having a slightly tapered or inclined lower surface 96 for cooperating with the socket-latching means also to be described more fully hereinafter.

THE SOCKET

Figure 5:
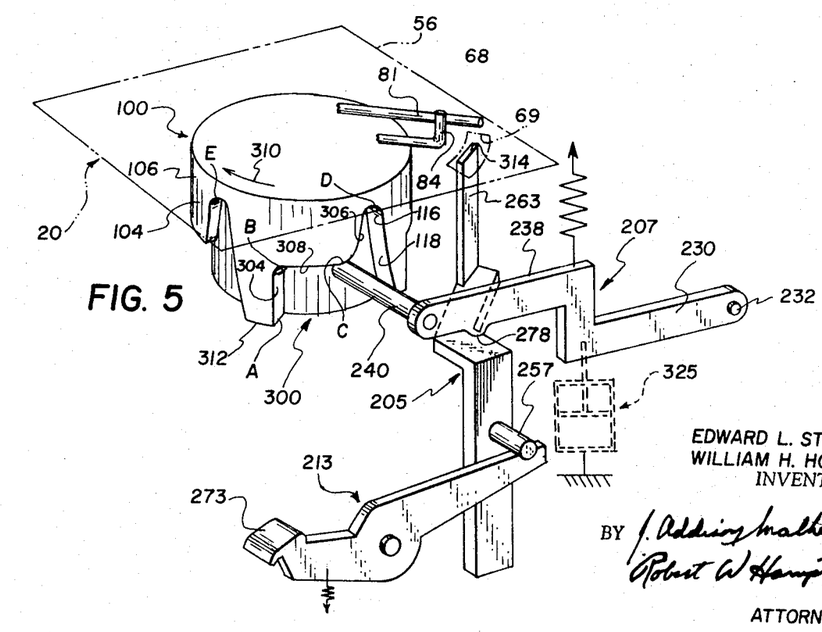
FIG. 5 is a schematic view of a control or dampening device in accordance with the present invention and illustrates socket and actuator structure for controlling the stepwise or dampened reentry of the actuator into the unit or cube.

Referring now to a preferred embodiment of socket depicted most clearly in FIGS. 2, 4 and 5, a cylindrical member 100 is illustrated defining a socket base 102 and walls 104 extending upwardly therefrom to define socket exterior surfaces 106 and interior surfaces 108. Extending upwardly from the interior portions of base 102 are a square post member 110, adapted to cooperate with the internal surfaces 90 of the cube channel member 64, and a plurality of flexible fingers 112, adapted to cooperate with the latching surfaces 96 on the exterior portion 92 of the channel member 64. Also extending in substantially the same direction as post 110 and fingers 112 are channel-defining means such as splines 114 adapted to cooperate with the cube ribs 94 to accurately and securely maintain the cube in a predetermined position of orientation in the socket. These splines are thin walled and flexible to compensate for manufacturing tolerances in molding the socket. For example, if the socket splines (and/or cube ribs) are not exactly located at 90° from each other, the splines still can flex somewhat to receive the cube in a proper manner. Moreover, if desired, the socket splines can be formed purposefully to flex outwardly and pinch the cube ribs to even more securely hold and locate the cube in the socket even when the manufacturing tolerances are accurate.

The external surfaces 106 of the socket are provided with, or have attached or coupled thereto, camming means 116 having a steeply inclined surface 118 on at least one side thereof, as will be more fully described hereinafter in connection with the present invention. Abutment or indexing means 119 also are provided to cooperate with socket-indexing means operated by the film-winding mechanisms briefly mentioned above.

Upon inserting a flashcube into the socket, the aligning post 110 in the socket engages the interior 96 of cube channel member 64 to initially align the cube relative to the socket and to insure that the cube is oriented in a proper angular relationship with respect to the socket. Similarly, the lower or tapered portions of ribs 94 engage and initially orient the cube within the socket splines 114. As the cube further is pushed to its final position in the socket, the central socket post 110 engages interior portions of the cube channel member 64 to prevent tilting of the cube relative to the socket, and the upper or square portions of ribs 94 engaged and closely cooperate with the internal surfaces of the socket to accurately and securely orient the cube. Also during the final stages of cube positioning, the socket-latching fingers 112 engage the cube-latching surfaces 96 to securely but releasably hold or maintain the cube in the socket. As described more fully in U.S. Pat. No. 3,407,717, issued on Oct. 29, 1968, in the name of P. J. Ernisse, these latching fingers further may be provided with cam or tapered end surfaces for biasing the cube downwardly into the socket.

For a purpose to be described more fully hereinafter, in connection with FIG. 4, the socket post 110 further includes means defining cut out sections or slots 120 (FIG. 4) passing entirely through the post to a hollow post interior or bore (not shown). This interior is adapted to slidably receive a cube-sensing member or T-bar 121 having a body portion 122 and an upper end or portion 124 with cube engaging blades or flanges 126. In an assembled condition, blades 126 are adapted to extend from the post interior, through slots 120, and into the socket interior where they will be engaged by the cube channel member 64 when the cube is positioned in the socket. Normally, the T-bar is resiliently biased to a first or raised position and is cammed or pushed downwardly to a second and lowered or retracted position upon positioning of a cube in the socket, thereby to set or adjust certain camera mechanisms as will be described more fully hereinafter in connection with such mechanisms.

IMPACTING MEMBER OR SHUTTER DRIVER

The impacting member or shutter-driving member 129 (FIG. 4) is of two-part construction and comprises a main body portion 132 pivotally mounted within the camera casing, and a leg or extension 134, including a driving portion 136, adapted to rapidly strike or drive the shutter blade to its open position in a manner known to those skilled in the art. As previously mentioned, the driving member is set or cocked, for example, by oscillation of film winding member 42, to a first or energized position illustrated in FIG. 4, and then may be released by the body or shutter release 16 to rapidly move into striking or impacting engagement with the shutter blade to open the blade against the force of its shutter return spring (not shown). The shutter blade then rotates in a clockwise direction (FIG. 4) until its direction of movement is reversed either by the return spring or a shutter stop (not shown), at which time the spring again returns the blade to its closed position over the camera aperture. Of course, the speed, or amount of time during which the aperture is opened is determined by the resiliency of the return spring and/or the position of a shutter stop. Further features and functions of this driver member will be described hereinafter in connection with the flash-firing mechanism.

FLASH-FIRING MECHANISM

Referring nor more particularly to FIG. 4, the flash sensing and/or firing mechanism includes the previously mentioned releasing means or T-bar 121, a bell or latching and setting member 203, a sensing or actuating member 205, a camming or retracting mechanism 207, a signal mechanism 209, shutter-speed-changing means 211, and a force-transmitting arm or striking lever 213.

In this preferred embodiment, these mechanisms both sense the operative or inoperative condition of the flashlamp and effect firing of the flashlamp, but it should be understood that the present invention could be used with a similar mechanism for accomplishing either of these functions alone.

As will be described more fully hereinafter, these mechanisms are maintained in inactive positions (not shown) prior to positioning of the cube on the camera. However, for present purposes the mechanism will be described mainly in connection with FIG. 4, which illustrates these mechanisms in the positions they will assume after a cube having an operative striker wire at the firing locus has been positioned on the camera. Prior to positioning of the cube on the camera, T-bar 121 is maintained in an upper or raised position within the socket post 110 and the various other sensing and actuating elements, such as actuating member 205, are retained in retracted or inactive positions. However, when a cube is inserted into the socket, the T-bar is moved to a lowered or releasing position, by engagement between the cube indexing member 64 and the T-bar fins 126, to release these elements to the positions illustrated.

Bell or setting member 203 is mounted within the camera, for example, by means of a mechanism plate 217, and includes a central portion 219 having suitable means mounting the member for pivotal movement between a first clockwise and latching position and a second counterclockwise and unlatching or releasing position. One end of the member 203 is provided with a projection or abutment 223 adapted to be engaged by the lower end of the T-bar 121, as described above, for rotating the setting member to its counterclockwise and releasing position (FIG. 4) in response to the positioning of a cube on the camera. The other end or leg of the setting member 203 is provided with a bent lug 225 supporting a resilient means or spring 227, and an abutment surface 229 for articulate coupling of the setting member to the camming or retracting mechanism 207. When no cube is positioned on the camera, spring 227 serves to maintain both the setting member 203 in its clockwise and latching position and the T-bar in its raised or extended position.

The camming or retracting mechanism 207 also is mounted on mechanism plate 217 and is provided with a central portion 230 including suitable means 232 for pivotally mounting the mechanism within the camera. A first end or leg 234 of the camming or retracting mechanism is provided with a surface 236, or other means, defining an articulate connection with the setting member 203, while a second end leg or arm 238 of the camming and retracting mechanism includes a camming surface or extension 240 adapted to be received in and follow the camming means 116 of the socket. As will become more apparent hereinafter, the camming mechanism is movable between first or retracted positions and second or extended positions, either in response to movement of the socket and its cam surfaces 116 or in response to movement of the setting member 203.

The shutter-speed-changing mechanism 211 is more fully described and illustrated in the aforementioned concurrently filed Sturm application Ser. No. 850,125. Briefly, however, this mechanism comprises an arm 241 pivotally mounted within the camera casing at 242 by any suitable means, and includes a first leg 246 having a cutout portion or slot 248 adapted to receive the bent lug 225 of the bell or setting member 203. The other leg 250 includes an abutment or shutter stop (not shown) briefly mentioned hereinabove and adapted in one position to be engaged by the shutter blade to provide one speed of shutter operation. In another or second position of the speed-changing lever, the stop is moved to a position where it will not be engaged by the shutter blade, to provide another or a different speed of shutter operation. As will become more apparent hereinafter, the speed-changing lever is moved between its respective positions by bell or setting and latching member 203 and in response to the positioning (or removal) of a flashcube in the socket.

The sensing or actuating member 205 includes an elongated body portion 254 including first and second pins 256, 257 received through slots 258 in the mechanism plate and mounting the member for longitudinal or sliding movement relative to the mechanism plate and camera body. Moreover, one of these pins 257 further is adapted to be engaged by striking lever 213 to effect firing of a flashlamp, as will be described more fully hereinafter. At an upper portion of the actuating member, first and second legs 261 and 263 are provided, respectively, for engaging a bent leg 264 of the signal mechanism 209, and for engaging the striker wire 81 in the flashcube to sense and dislodge the same.

Signal mechanism 209 comprises a signal or flag 262 and an articulate linkage 265 for coupling the flag to the sensing and actuating member 205 and for pivotally mounting the flag, for example, on the mechanism plate. At one end, the articulate connection includes the bent leg 264, adapted to engage the first leg 261 of the sensing or actuating member, while the other end of the connection includes a forked leg 267 for receiving a bellcrank member 269 of flag 262. In operation the flag is movable by the linkage 264 between a first or retracted position and a second position in which it extends into view in the camera viewfinder. In this second position the warning flag is intended to signal the camera operator and warn him of the fact that the flashlamp in the firing position is inoperative, for example, because it has already been fired.

Striking lever 213 is mounted on the mechanism plate 217 or within the camera casing by means of a pivot pin 271 extending through a central portion of striking lever to pivotally mount the lever on the mechanism plate. One end portion of the striking lever includes a bent camming arm or striking surface 273 adapted to be impacted or driven by a hammer member or striking abutment 275 on the shutter driver, as will be described more fully hereinafter. The other end of the striking lever defines a leg 277 adapted to contact the pin 257 of the actuating member to effect rapid movement of the actuating lever to a raised position for dislodging the cube striking wire 78 and firing the cube. As also will be described more fully hereinafter, in connection with the operation of the sensing and firing mechanism, the arm is adapted to assume or move between any one of three positions *a*, *b* or *c* depending respectively on whether a cube is positioned on the camera and, if so, whether or not the forwardly facing flashlamp is operative.

OPERATION OF SENSING AND FIRING MECHANISM

Referring now to the operation of the above described mechanism, prior to the positioning of a flashcube on the camera the setting or latching lever 203 will be maintained in its clockwise and latching position *a* by relatively strong spring 227. In this position one end of the lever maintains T-bar 121 in its extended or raised position within the cube while the other end of the lever holds or latches the camming mechanism 207 in its counterclockwise or withdrawn position. Similarly, the camming mechanism 207 engages and blocks the actuating and sensing arm 205 at 278 and thereby holds the arm in a lowered or retracted position wherein the arm is enclosed entirely within the camera casing to protect the arm. With the arm in this lowered or retracted position *a* the pin member 257 thereon secures the striking lever 213 in a most counterclockwise or inactive position wherein it will not be impacted or engaged by the hammer 275 upon shutter actuation. Moreover, the first leg portion of the sensing and actuating member will maintain the signal or flag 262 in a raised position out of view in the camera viewfinder. Still further, so long as the bell or setting and actuating lever 203 is maintained in this clockwise position, it will hold the shutter-speed-changing lever 211 in its most clockwise position wherein its abutment or shutter stop will be engaged by the shutter to effect shutter operation at its faster speed appropriate for daylight exposures.

When a flashcube is positioned on the camera, and the forwardly facing flashlamp thereof is in an operative condition, the cube will engage T-bar 121 and move the T-bar to its lowered or retracted position (FIG. 4), thereby rotating the setting or latching lever 203 in a counterclockwise direction and releasing the camming mechanism 207 and sensing or actuating arm 205. Thereupon the sensing and actuating arm will move to its raised or extended position in engagement with a preenergized striker wire 81 associated with the forwardly facing flashlamp. With movement of the sensing and actuating arm to the raised position, the flag linkage 264 will pivot the flag somewhat toward the lowered or retracted position thereof. However, such pivotal movement will not be sufficient to move the flag to a visible position in the camera viewfinder. Similarly, the striking lever 213 follows pin 257 and moves in a counterclockwise direction until the striking or camming surface 273 thereof is positioned at a location *b* (FIG. 4), where it will be impacted or struck by the hammer member 275 when such driver is released. Thus, when the body release 16 is depressed, and the shutter driver rapidly moves to its second or released position, it will synchronously effect an exposure and fire the flashlamp by striking both the shutter blade and the force transmitting or striking lever 213, thereby opening the shutter and moving the sensing and actuating arm 205 to its fully raised position. Moreover, with the bell or sensing and latching lever 203 in this counterclockwise position, the shutter speed changing lever 211 will be rotated to move the shutter stop to its second or inoperative position where it will not be engaged by the shutter blade upon actuation thereof. Therefore, the shutter speed will be adjusted to a longer cycle or speed appropriate for flash exposure.

When a cube is position on the camera with an inoperative forwardly facing flashlamp, the sensing and actuating member 205 will be released as described above to move to its raised position, but, in this case, will move to an overextended position beyond where it ordinarily would engage the preenergized striker. In this position of the sensing arm the first leg 261 thereof will effect movement of the signal or flag 262 even further into the viewfinder where it will be visible by the camera operator to warn of an inoperative flashlamp. Moreover, the striking or cam surface 273 of striker lever 213 will be moved to an even farther counterclockwise position c where it again will not be engaged by hammer member 275 of the shutter driver when such driver is released to expose film in the camera.

After firing the flashlamp the camera is prepared for the next picture-taking operation by winding of film as set forth hereinabove. Upon such film winding the flashcube socket is indexed or rotated to position the next flashlamp in the forwardly facing position or firing locus. In order to permit such rotation, the sensing and actuating finger is withdrawn from the cube by engagement between the camming surfaces 116 on the socket and the cam follower or projection 240 of camming mechanism 207. As the socket is rotated, this camming device withdraws or forces the camming mechanism 207, and along with it the sensing and actuating member 254, to a lowered position wherein the actuating arm 263 is below the cube base. The sensing and actuating member will remain in this lowered position as the cube and socket are rotated and until the next flash lamp is positioned in the firing locus, at which time the camming surfaces 116 again permit the camming mechanism and sensing and actuating arm to move upwardly into engagement with the next preenergized striker wire.

CONTROL OR DAMPENING DEVICE

Referring now to FIG. 5, and more particularly to the details of a preferred embodiment of the present invention, a control or dampening device 300 is illustrated for preventing the accidental firing of a flash lamp upon indexing or rotation thereof to the forwardly facing position. As illustrated the device comprises means defining additional control or cam surfaces including a first step or slide 304, a second step or slide 306, and an intermediate connecting portion or slide 308, extending between the first and second slides, to form a continuous but stepped control or cam surface leading into the retracting cam 118. While two distinct stepped portions 304 and 306 have been shown, it should be understood that any number of such portions could be used, and, further, that each portion could be of a less distinct or sharp contour than illustrated, so long as the upward velocity of the arm is substantially reduced prior to engaging the striker wire and reasonably regardless of the rotational velocity of the socket. For example, such upward movement may be substantially arrested when the arm is substantially 0.130 inches from the striker wire, and in this case, the arm may be arrested either by the cube base itself or by the cam control structure. Preferably, however, upward movement of the arm is substantially completely arrested by the cam control structure at a position or point when the arm is adjacent or more closely spaced from the striker wire and even though the socket is rotated at a relatively rapid rate, for example, of 900° per second or 90° in 0.1 second. Thus, in the preferred embodiment, movement of the arm is substantially arrested at least once within 0.010 inch from the wire, or, less preferably, within the range between 0.005 inch and 0.130 inch from the wire. In this preferred example, upward movement of the arm substantially is arrested at least at a position above the lower surface of the cube base, although it also may be arrested, in a stepwise manner, once at such a position above the lower base surface and one or more other times at or below such base surface.

A more specific example is set forth below with reference to points labeled A, B, C, and D on the drawings respectively representing approximately 22°, 22°, 85°, and 90° of socket rotation from the immediately previous socket detent position E; that is, the position of the socket before the previous flash lamp was indexed from the forwardly facing position or firing locus.

The lowermost or outer base surface portion 312 of the camming device is configured and located relative to the camera to withdraw the uppermost portion 314 of the actuating arm to a position spaced approximately 0.010 inch from the bottom face of the cube base. The slide or face 304 then extends upwardly from surface portion 312 at an angle of substantially 90 degrees from the vertical to slide or face 308. In turn, face 308 extends substantially horizontally over 63° of rotation to the rounded corner at point C. At this point, the connecting face 308 is configured to space the uppermost portion 314 of actuator 205 approximately 0.010 inch from the flash lamp striker immediately after the opening in the cube base rotates into alignment over the actuator. Slide or face 306 extends upwardly from point C at substantially 5° from the vertical until it curves into the uppermost point D. When the follower 240 is at point D, the uppermost portion 314 of the actuating arm would be spaced above the striker wire by approximately 0.130 inches, except for the fact that such fully extended upward movement will be blocked by an energized striker wire. These particular parameters have been established for use with a striker requiring the equivalent of approximately 4 ounces static load for dislodging, and have been found operative with rotation rates of 90° in one tenth (0.1) of a second, although it also is believed to be operative at even faster rates of rotation.

Regardless of the particular cam shape, however, it is desirable that the actuating member first engage the striker with less than the equivalent of 3 ounces static load even when the cube is rotated at a reasonably rapid rate.

In operation, and as the socket is rotated, the actuating arm will first be withdrawn from the flashcube to a position wherein the uppermost surface 314 of actuating arm 205 will be spaced by 0.01 inch from or below the cube base. Thereafter, the cam follower 240 will drop off the lowermost face 312 to rest on intermediate face 308. This will permit movement of actuating member 205 upwardly until the uppermost portion 314 thereof engages and rides on cube base 56. At this moment the actuating member 205 will be spaced from the camming mechanism 207 at their normal point of engagement 278, and the position of the actuating member will be determined substantially entirely by its engagement with the cube base. Upon further socket rotation, and when the follower 240 reaches point C, the uppermost actuator portion will drop into opening 69 in the cube base and the actuating arm 205 will move into engagement with and be blocked by the camming mechanism 207 at point 278. Such engagement will substantially arrest further upward movement of the arm with the uppermost portion 314 thereof adjacent but spaced from the wire by approximately 0.010 inches. With still further socket rotation, the follower 240 will move to position D and the camming mechanism 207 again will move out of contact or blocking engagement (at point 278) with the actuating arm 205 to permit the latter to move into nonreleasing engagement with and rest against the striker wire 81. Thereafter, and as described above, the actuating arm can be impacted to dislodge the wire and fire the flash lamp without interference from the camming mechanism.

In the illustrated embodiment, the control or dampening cam has been formed or molded as an integral part of the socket itself, but it should be understood that the control means could be otherwise attached to the socket or even separated therefrom with an articulate or coupling means similarly controlling the actuating arm in response to socket rotation.

In a second embodiment, illustrated in dotted lines on FIG. 5, a dampening means such as a dashpot 325 has been illustrated in a position coupled at one end to the camming mechanism 20, and at the other end to the camera casing or mechanism plate. This embodiment could be used either in lieu of or in addition to the control of dampening structure described above. In operation, any rapid upward movement of the mechanism 207, and thereby also the actuating member 205, is prevented or dampened by the dashpot when the socket is indexed, thereby preventing accidental firing of a flash lamp upon such indexing. However, since the camming mechanism 207 will move to an uppermost position spaced from actuating member 205 when follower 240 reaches point D, the dashpot 325 ill not retard or have any effect on movement of the arm during intentional firing of the flash lamp.

It should now be apparent that the present invention provides an improved mechanism for sequentially sensing and firing percussively fireable flash lamps indexably receivable on a photographic camera or attachment, and includes control or dampening means for preventing accidental firing of the flash lamps upon indexing thereof.

The invention has been described in detail with particular reference to a preferred embodiment thereof, but it will be understood that variations and modifications can be effected within the spirit and scope of the invention.

We claim:

1. An actuator control mechanism for apparatus adapted to mechanically fire respective ones of a plurality of flash devices, each device having a flash lamp and a preenergized striker releasable to fire the lamp; the apparatus including an actuator first movable to a predetermined position for engaging a respective striker, and then drivable to release the striker and fire its respective flash lamp; the apparatus further including means for indexably receiving the flash devices to locate respective ones of the devices at a position to be fired by the actuator; the control mechanism comprising:

means responsive to indexing of the flash lamps first for withdrawing the actuator to a position spaced from the predetermined position to permit indexing of the flash lamps, and thereafter for returning the actuator to the predetermined position for engaging a respective striker wire; and, a dampening device for dampening return movement of the actuator to the predetermined position to prevent accidental firing of the flash device.

2. An actuator control mechanism as claimed in claim 1, wherein the dampening device includes means for temporarily arresting substantial movement of the actuator, said substantial movement being arrested when the actuator is less than 0.130 inches from the striker but simultaneous with or before the actuator engages the striker, thereby to prevent accidental firing of the flash lamp.

3. An actuator control mechanism as claimed in claim 1, wherein the dampening device includes means rotatable in response to indexing of the flash devices defining a stepped cam surface for controlling at least a portion of the return movement of the actuator.

4. An actuator control mechanism as claimed in claim 3, wherein the damping device includes a clocking member movable under control of said cam means, said blocking member engaging the actuator for temporarily arresting return movement of the actuator during indexing of the flash lamps and to prevent accidental firing of the flash lamps, said blocking member being spaced from the actuator after indexing to permit firing of a respective flash lamp.

5. A photoflash firing mechanism in photographic apparatus and for firing respective ones of a plurality of flash devices supported in a multilamp unit, the unit being indexably receivable on the apparatus to locate respective ones of the flash devices at a firing position; the mechanism comprising;

an actuating member movable between extended positions for engaging and firing a respective flash device, and retracted positions permitting indexing of the devices; and, a control mechanism for retracting the actuating member as a respective first flash device is indexed from the firing position, and then for effecting return of the member into engagement with a respective second flash device as such device is indexed to the firing position, said control mechanism including dampening means for substantially restraining return of said actuating member to prevent accidental firing of the flash devices upon indexing thereof.

6. A firing mechanism as claimed in claim 5, wherein said control mechanism includes a blocking member movable between an extended position and a retracted position and adapted to engage said actuating member to control movement thereof, said control mechanism further including a dashpot coupled to said blocking member for retarding movement of the member from its retracted to its extended positions; said member engaging and controlling at least a portion of the return movement of the actuating member into engagement with the striker and thereafter moving out of blocking engagement with the actuating member to permit movement thereof to the second extended position for intentional firing of the flash lamp.

7. A photoflash sensing and firing mechanism in photographic apparatus and for sensing the condition of and firing respective ones of a plurality of flash devices supported in a multilamp unit; the unit being indexably receivable on the apparatus, and the flash devices each including a flashlamp and a preenergized striker releasable to percussively fire its respective flash lamp; the sensing and firing mechanism comprising:

a sensing and actuating arm movable between first and second extended positions and a retracted position, the first extended position for engaging a respective preenergized striker to sense the condition thereof, the second extended position for releasing a preenergized striker to fire the respective flash lamp, and the retracted position for permitting indexing of the flash devices; and, a control mechanism for moving said arm to its retracted position upon indexing of the flash devices and for moving said arm to its first extended position as indexing is completed, said mechanism including a camming device for effecting stepwise return of the arm into sensing engagement with the striker without releasing the striker.

8. A mechanism as claimed in claim 7 wherein said camming device includes movable blocking means adapted to be engaged by the sensing and actuating arm to control at least a portion of the movement of the arm to its first extended position, and wherein said blocking means moves out of engagement with the arm after the arm engages the striker such that the control mechanism will not effect movement of the arm upon intentional firing of the flash devices.

9. A photographic camera for use with a multilamp flash unit, the unit including a plurality of percussively ignitable flash devices each having a flash lamp and a preenergized striker releasable to fire its respective flash lamp, the camera comprising:

a socket for detachably retaining the flash unit;

means for indexing the socket and a flash unit retained therein to place respective ones of the flash devices at a firing position on the camera;

a sensing and actuating member movable between a first extended position and for engaging a flash lamp striker to sense the condition thereof, and a retracted position and to permit indexing of the flash devices, said member being drivable from said first extended position to a second extended position to release an engaged striker and fire its respective flash lamp;

a control arm responsive to indexing of the socket and movable between a raised position and a lowered position, said arm engaging said sensing and actuating member upon indexing of the socket to move the member to its retracted position as a first respective flash device is indexed from the firing position; said arm engaging and controlling return movement of the member to its first extended and sensing position during at least a portion of the return movement of the arm; and a dampening device for effecting stepwise movement of said arm to its raised position such that the arm will engage and effect stepwise return movement of said sensing and actuating member to its first raised position in sensing engagement with a striker and without releasing the striker.

10. A control mechanism for photographic apparatus adapted to indexably receive and mechanically fire flash devices in a multilamp unit, the unit including a base for supporting the flash devices, and means defining openings in the base through which the flash devices are accessible for firing, the apparatus including an actuator movable between retracted positions, wherein the actuator is withdrawn from the base, and extended positions, through a respective opening and into the unit to engage and fire a respective flash lamp; the mechanism comprising;

means for moving the actuator to a retracted position thereof during initial indexing of the flash unit and to permit such indexing, said retracted position being spaced from the base; and, means for returning the actuator to an extended position thereof as indexing of the flash unit is completed, said returning means first moving said actuator into engagement with the unit base and thereafter permitting movement of the actuator into the opening in the base.

UNITED STATES PATENT OFFICE
CERTIFICATE OF CORRECTION

PO-1050
(5/69)

Patent No. 3,589,849   Dated June 29, 1971

Inventor(s) Edward L. Sturm and William H. Horton

It is certified that error appears in the above-identified patent and that said Letters Patent are hereby corrected as shown below:

Column 11, Claim 1, line 26:   Insert the word ---flash--- before "lamp"

Column 11, Claim 4, line 56:   The word "clocking" should be corrected to read ---blocking---

Signed and sealed this 25th day of January 1972.

(SEAL)
Attest:

EDWARD M. FLETCHER, JR.
Attesting Officer

ROBERT GOTTSCHALK
Commissioner of Patents